United States Patent [19]
Lea

[11] Patent Number: 6,115,373
[45] Date of Patent: Sep. 5, 2000

[54] INFORMATION NETWORK ARCHITECTURE

[75] Inventor: Chin Tau Lea, Kowloon, The Hong Kong Special Administrative Region of the People's Republic of China

[73] Assignee: The Hong Kong University of Science and Technology, Hong Kong, The Hong Kong Special Administrative Region of the People's Republic of China

[21] Appl. No.: 08/788,528

[22] Filed: Jan. 24, 1997

[51] Int. Cl.⁷ .............................. H04L 12/28; H04L 12/56
[52] U.S. Cl. ..................... 370/355; 370/395; 370/231; 370/466
[58] Field of Search ..................................... 370/235, 254, 370/352, 353, 361, 395, 394, 445, 465, 230, 396, 400, 466, 469, 355, 231; 395/200.7, 200.71, 200.74

[56] References Cited

U.S. PATENT DOCUMENTS

| | | | |
|---|---|---|---|
| 5,557,607 | 9/1996 | Holden | 370/395 |
| 5,673,263 | 9/1997 | Basso et al. | 370/396 |
| 5,715,250 | 2/1998 | Watanabe | 370/395 |
| 5,729,530 | 3/1998 | Kawaguchi et al. | 370/236 |
| 5,764,645 | 6/1998 | Bernet et al. | 370/466 |
| 5,768,273 | 6/1998 | Aznar et al. | 370/395 |
| 5,903,559 | 5/1999 | Acharya et al. | 370/355 |

*Primary Examiner*—Ricky Ngo
*Attorney, Agent, or Firm*—Burns, Doane, Swecker & Mathis, L.L.P.

[57] ABSTRACT

An information network architecture is described that can handle both ATM and IP traffic. The network emplpoys unbuffered switches that employ a system of priorities in the handling of ATM and IP traffic whereby ATM data is given higher priority to IP traffic, and the remaining cells of an IP packet that is being transmitted are given greater priority than the first cells of a new IP packet so that the cells of different IP packets are not interleaved.

17 Claims, 6 Drawing Sheets

A: ACTIVE BIT
P0 AND P1: TWO PRIORITY BITS
D0-D4: DESTINATION ADDRESS BITS

TIME →

INFORMATION NETWORK ARCHITECTURE

FIELD OF THE INVENTION

This invention relates to an architecture for an information and communication network. In particular it relates to such an architecture that is compatible with existing protocols and which allows existing networks to be integrated into a single system.

BACKGROUND OF THE INVENTION

Future information networks require two modes of operation, these are connectionless datagram and connection-oriented virtual circuit modes. Both these modes are well-known. The best known example of a connectionless datagram architecture is the internet protocol (IP), while the corresponding example of a connection-oriented virtual circuit architecture is asynchronous transfer mode (ATM) technology.

Connectionless IP is far more efficient than a virtual circuit architecture such as ATM for browsing, e-mail applications, and other non-realtime services, but it is limited in capacity by its router-based architecture. Fixed path virtual circuit architectures such as ATM are suitable for services which demand quality guarantee and real-time delivery, but they are inefficient for many non-realtime services due to their path set-up requirements.

However given the great popularity of the Internet and given the widespread acceptance of ATM as the broadband standard, both modes are likely to stay. Attempts to replace one with the other have failed.

For example, consider the resource reservation protocol (RSVP) proposed for the Internet. The idea of RSVP was to add resource reservation to IP so as to support real-time services such as audio or video links. The problem is that IP's routers change paths constantly, which is in the very nature of a connectionless network, and although it was initially argued that reservation could be achieved without fixing the path of a connection, it was subsequently realised that this may not be possible. Fixing the path has been proposed, but this creates more problems than it solves with the Internet losing the flexibility of a connectionless network. Even with path fixing the network still needs admission control, rate policing and so on to guarantee quality of service.

Similarly various proposals have been made to support connectionless service with ATM. These proposals include LAN emulation or IP-over-ATM, but in all cases the solutions do not escape the need to set up paths for connectionless services. They are highly inefficient and fail to break the capacity bottleneck of the current Internet. In the event of congestion, a single cell loss leads to loss of the entire IP packet (which can be as long as 1200 cells). When one cell is dropped transmitting the remaining cells achieves nothing but bandwidth waste. Additional measures, such as early packet discarding, must be taken to tame the problem. These proposals all add additional states to each virtual channel and additional complexity to the system.

Individually ATM and IP have their own drawbacks. In an ATM network to prevent bandwidth waste during silent periods statistical multiplexing for real-time traffic is required. However statistical multiplexing also demands complex methods for policing, billing, and admission control. In addition setting up a virtual circuit is a very wasteful way to support browsing and transaction type non-realtime services.

However, on the other hand, as the popularity of the Internet soars conventional IP-router implementation has reached its capacity limit and any significant increase in capacity is unlikely with current IP architectures. Furthermore bandwidth reservation is required for real-time services, but this is difficult to implement in a connectionless environment where the path changes constantly.

SUMMARY OF THE INVENTION

An object of the present invention is to provide a network architecture that integrates IP and ATM into a single architecture keeping the best features of both while eliminating their drawbacks.

According to the present invention there is provided an information network system comprising, a plurality of unbuffered switches, each said switch comprising input and output ports and being interconnected by datalinks to form a network, each said switch being associated with an ATM control processor and an IP control processor, and wherein said network is adapted to carry both ATM and IP transmissions, said IP transmissions being carried on a default virtual channel with no interleaving of IP packets.

It is important that the IP cells belonging to different IP packet are not interleaved and one way of achieving this is for the switches to handle incoming transmissions according to a system of priorities depending on the transmission type. In a preferred embodiment ATM transmissions are given priority over IP traffic, and in a particularly preferred arrangement, for example, highest priority may be given to operation function and multicast relay cells, followed by ATM realtime transmissions, then the remaining cells of an IP packet where transmission has already commenced, and lastly the lowest priority transmissions would be the first cell of a new IP packet.

The switches preferably have multicast capability and to provide this with a minimum of complexity the link list may be segmented to reduce fanout. This is implemented by a folded switch architecture with the input and output port processors colocated.

One of the advantages of the present invention is that it allows for congestion control means to be provided. For example, in the event of congestion the IP default channel may be used to send a congestion indication signal backwards to the output port of an upstream switch. When the switches have full multicast capability and a folded architecture this congestion indication signal can be very rapidly and easily be sent to various parts of the network. In addition a system according to the present invention may efficiently employ a packet discarding system.

The present invention also extends to a method for transmitting IP and ATM data on a single network wherein IP and ATM cells are transmitted along a link with a system of priorities wherein ATM transmissions have higher priority than IP transmissions, and wherein the remaining cells of an IP packet after initial transmission of a first cell are given higher priority than the first cell of a new IP packet.

Furthermore the invention extends to providing an unbuffered switch for use in an information network system comprising,
   a plurality of input and output ports for respectively receiving and transmitting data,
   a switch matrix for interconnecting selected input ports with selected output ports,
   and a controller for controlling said switch matrix in response to destination information in said received data, wherein said controller further comprises means for controlling said switch matrix in response to priority information in said received data.

BRIEF DESCRIPTION OF THE DRAWINGS

An embodiment of the invention will now be described by way of example and with reference to the accompanying drawings, in which.

DETAILED DESCRIPTION OF PREFERRED EMBODIMENT

Figure 1:
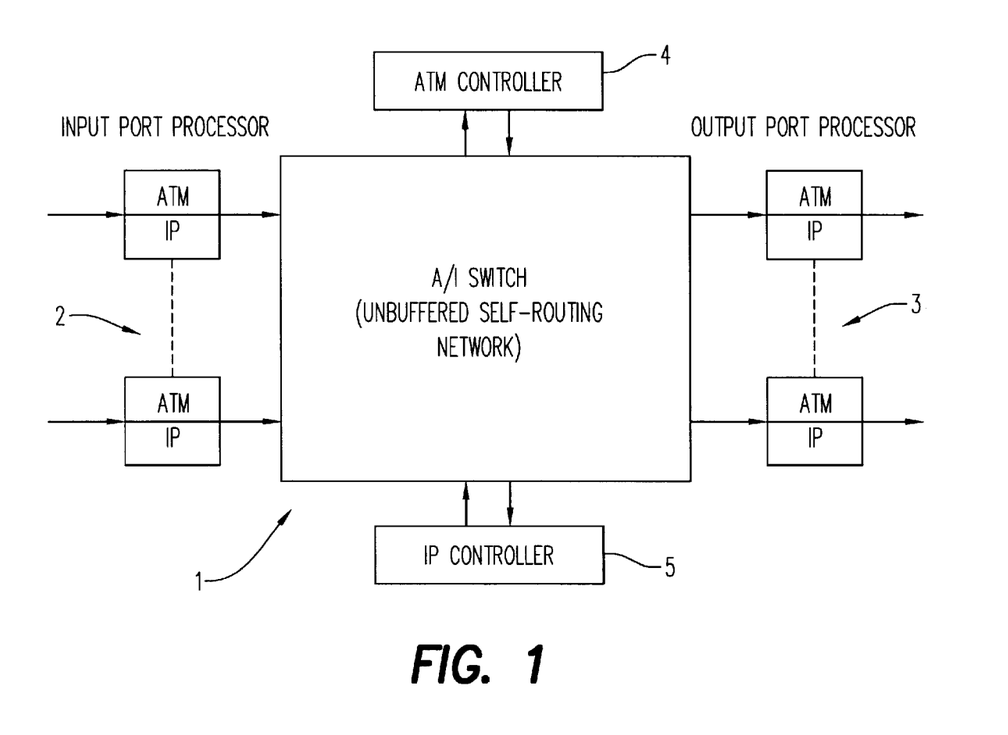
FIG. 1 is a block diagram of a switch forming part of a network according to an embodiment of the present invention.

Referring firstly to FIG. 1 there is shown a switch 1 that forms the heart of the network architecture. The switch 1 is shown comprising a plurality of input port processors 2 and a plurality of output port processors 3. Each input processor 2 and each output processor 3 comprises two parts, one for ATM and one for IP, and additionally the switch comprises two control processors 4,5. Control processor 4 handles call processing for ATM and control processor 5 performs a function similar to an IP router. In the present embodiment only one IP router is described, but it will be understood that in larger switches more may be required.

Figure 7A:
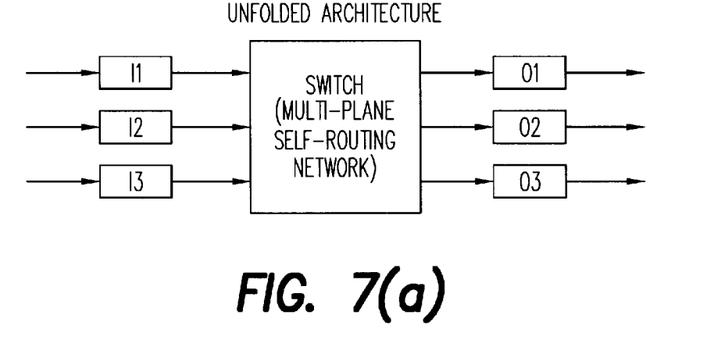
FIG. 7 shows a folded switch architecture.

As will be described in more detail below, the input and output port processors are in fact co-located inside a single chip (FIG. 7) in order to provide a folded switch having advantages for multicast implementation.

In the network of the present invention ATM cells are used for real-time services and are given a higher priority than IP cells. However it may also be possible for some ATM virtual channels to carry non-realtime data and services and in such cases they would be given the same priority as IP traffic.

Figure 2:
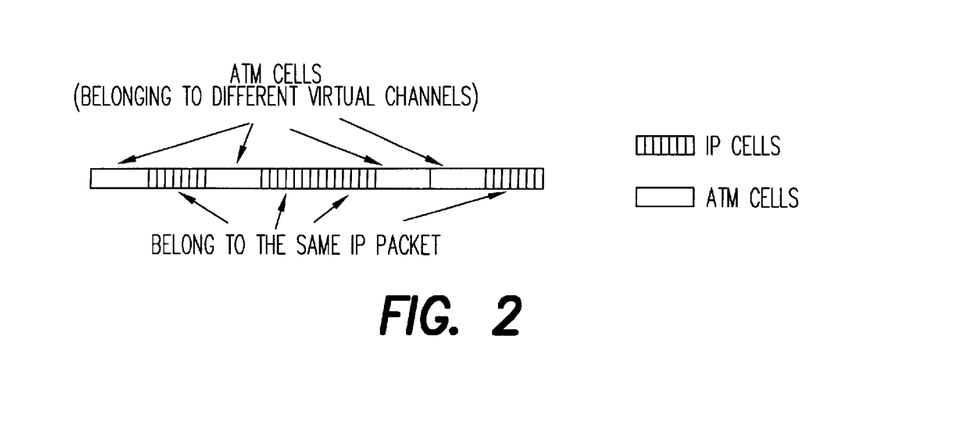
FIG. 2 illustrates schematically a datastream comprising IP and ATM cells.

In the present invention IP cells are carried by a default channel throughout the network. This means that ATM and IP cells are mixed on a link, however amongst the IP cells themselves consecutive IP cells belong to the same IP packet and there is no interleaving of IP packets. An example of such an arrangement is shown in FIG. 2 which shows a link carrying a number of ATM cells—which may of course relate to separate ATM virtual channels—interspersed with IP cells belonging to the same IP packet, until of course that IP packet ends and a new IP packet begins. This non-interleaving cell transmission is achieved by appropriate prioritisation of data transmissions and the use of an unbuffered switch. Transmissions are divided into four classes of importance, with class 1 being the highest priority:

Class 1: Operation function and multicast relay cells
Class 2: ATM realtime traffic
Class 3: Remaining cells of an IP packet after initial transmission of the first cell
Class 4: The first cell of a new IP packet These are internal priorities implemented within the switch 1 in a manner to be described frrther below. The allocation of classes 3 and 4 means that once the first cell of an IP packet reaches a destination port, the remaining cells will be transmitted with a higher priority than other IP packets. Combined with the use of an unbuffered switch this ensures non-interleaving of IP packets. ATM transmissions have higher priority still—as is necessary in view of the realtime nature of ATM transmissions—and ATM real-time traffic can still interleave with the cells of IP packets, which however has no effect on the IP operation.

Figure 3:
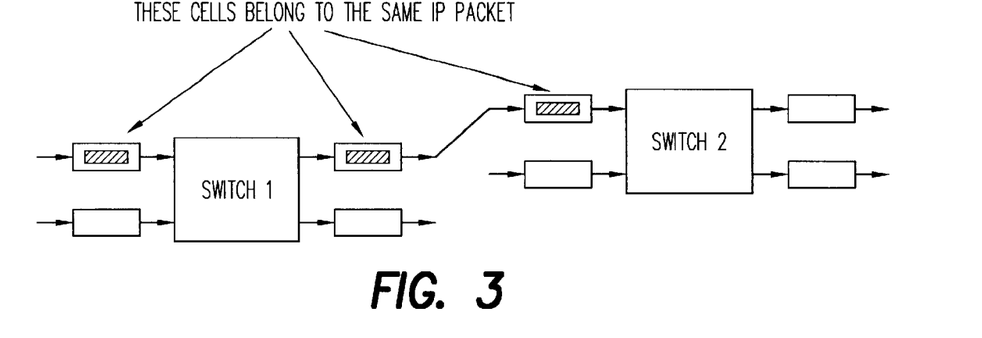
FIG. 3 shows the routing of an IP packet in a network.

As will be described below non-interleaving of IP packets provides a number of advantages, including allowing packet-based discarding and congestion control, and it also makes trivial the packet assembly at the final destination. In addition non-interleaving of IP packets also provides for a cut-through transmission or "wormhole routing" of the IP packets from one switch to the next as is illustrated in FIG. 3. When the first cell of an IP packet arrives at an input port it will be processed and the output port retrieved. Transmission of the IP packet to the next node can then begin immediately even if the rest of the packet is still being transmitted to the first switch and no packet assembly is needed before it is retransmitted.

Figure 8:
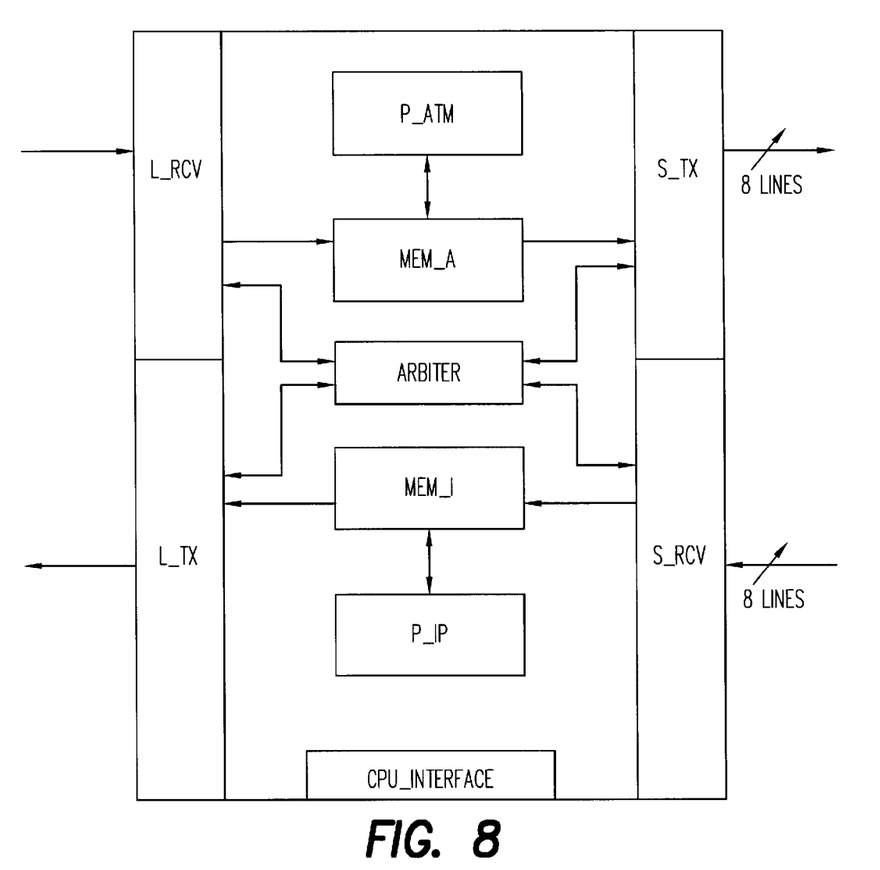
FIG. 8 shows the basic structure of an input/output port processor.

FIG. 8 illustrates the basic structure of an input/output (I/O) port processor. The processor comprises a number of modules, these include: a link receiver (L_RCV) for receiving data from a link; a link transmitter (L_TX) for transmitting data to a link; a switch receiver (S_RCV) for receiving data from the switch; a switch transmitter (S_TX) for transmitting data to the switch; a processor for handling ATM cells (P_ATM); a processor for handling IP cells (P_IP); memory for ATM cells (MEM_A); memory for IP cells (MEM_I); and a controller for memory access arbitration (Arbiter).

Figure 9:
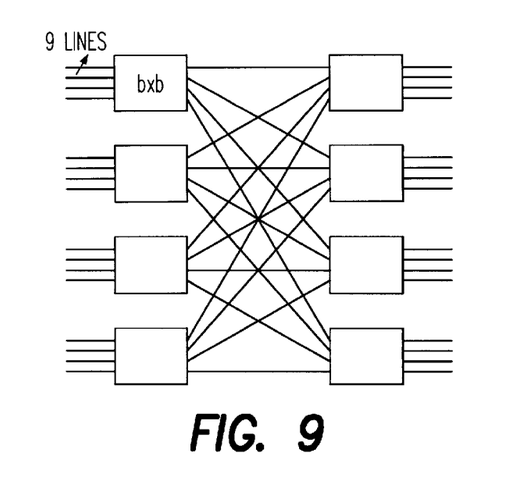
FIG. 9 shows an example of a switch comprised of sub-switch elements.

In principle the switch may be a simple single-stage switch (for example a 4×4 switch). In practice, however, a more complicated switch is necessary to provide the maximum possible routing variations and will comprise a multiple-stage unbuffered self-routing network constructed out of a number of basic b×b switch elements. FIG. 9 shows an example of a 16×16 switch with 4×4 switches as the basic switch element. It will be appreciated, however, that this is purely by way of example and other arrangements are also possible. What is important about the switch design, however, is that it should preserve non-interleaving transmission of IP packets throughout the network.

Figure 10:
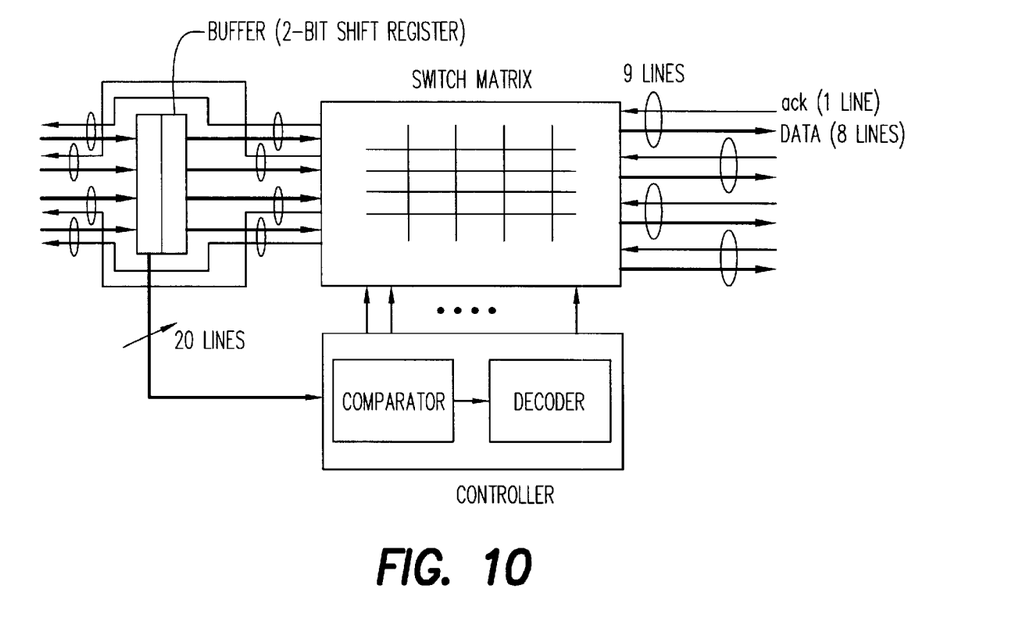
FIG. 10 shows the switch in more detail.
Figure 11:
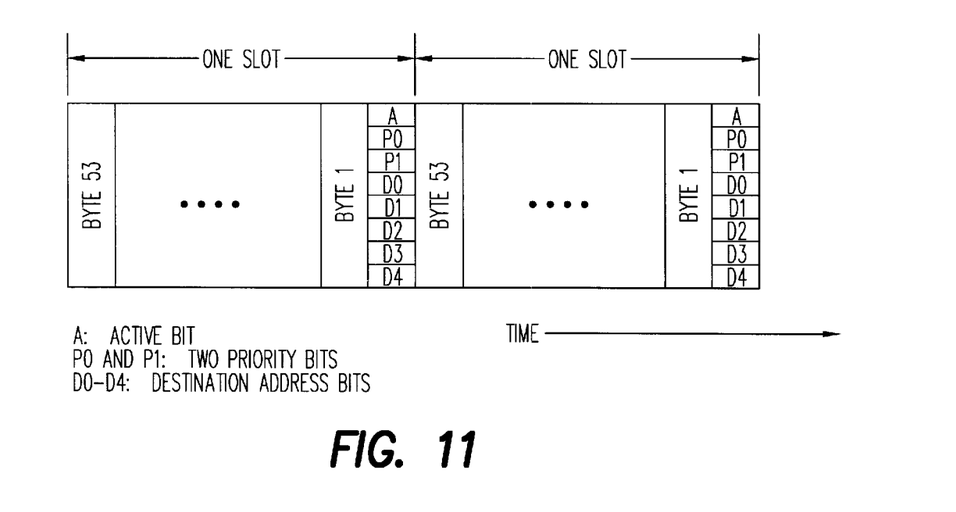
FIG. 11 shows the form of the data received by the switch.

FIGS. 10 & 11 illustrate the design and operation of the switch in more detail. A number of elements and parameters in the design are of course variable. These include the number of bits transmitted simultaneously (8 in the present example), the number of bits in the buffer (2 in the present example) and the size of the basic switch element (here 4×4).

Both ATM and IP cells are transmitted simultaneously from all inputs byte-by-byte. As is shown in FIG. 11 the transmission is done in a slotted fashion and all stations transmit simultaneously. To speed up the transmission multiple bits may be transmitted simultaneously inside the switch. In the embodiment illustrated 8 bits are transmitted simultaneously, although a wider bus (for example 16 bits) can also be used to further increase the throughput. In addition a greater number of possible destinations can easily be achieved, for example by adding a second byte for further destination information.

Each slot comprises 54 bytes (53 for the ATM or IP cell plus one for set-up). The information carried in the first connection set-up byte is as follows:

A=1 if the slot contains a valid cell

P0 & P1=Priority bits

D0–D4=Destination bits of which only two are used for path set-up at each stage

The switch (FIG. 10) comprises two parts, a controller and the switch matrix. The switch matrix is a combinational circuit and contains 4×4=16 crosspoints, each crosspoint being set by the controller such that when a cross-point is set eight data lines will be sent in a forward direction and one line in a reverse direction (as acknowledgment). The controller uses the first byte of a slot to set-up the states of the switch matrix. The amount of time required to do this determines the buffer size—the greater the length of time required to do the set-up, the greater the buffer that is needed. In the embodiment described a two-bit buffer is provided and this provides the controller to set-up the states in this time. If more time is needed, more bits are needed in the buffer.

Since multiple inputs can request the same output some traffic must from time to time be blocked. The controller decides which of competing requests to grant on the basis of the priority level of the incoming data. As can be seen in FIG. 10 the controller is divided into a comparator and a decoder. The comparator compares all requests and resets the A bit of a request if some other input requests the same output link and has a higher priority—the priority of incoming data being determined by the second and third bits of the first byte. When two inputs with the same priority request the same output link, the comparator will choose one of the two inputs randomly. When the input signals are output from the comparator all inputs with the A bit set are designated for different outputs. These modified first bytes will then be sent to the decoder which stores the state information of the 16 cross-points of the switch matrix.

After an input is connected to an output, data from the input will be sent to the next stage and the corresponding node at the next stage will repeat the same procedure. When the data traffic finally reaches its destination a reverse path for acknowledgement, which consists of only one line (see FIG. 10 which shows eight datalines and one for acknowledgement), is also established through which the S_RCV of the destination I/O port processor sends an acknowledgement signal back to the S_TX of the source's I/O port processor. The absence of this acknowledgement signal will indicate to the source that the transmission is blocked in the current slot. Because the acknowledgement has to be received before the next slot begins transmission this delay needs to be kept as short as possible. In the present embodiment the delay is minlmised because the acknowledgement signals do not go through the buffer.

As is explained above the first cell of an IP packet has the lowest priority in this embodiment class 4 priority. However, after the first cell of an IP packet reaches an output port future cells become class 3 priority and the S_RCV of the I/O port processor must reject all other class 4 requests. This may be achieved with a priority filter at the S_RCV. Through this scheme non-interleaving transmission for IP packets is achieved. When the last cell arrives, which is indicated by a specific bit of a cell of a higher layer protocol (such as the AAL layer of ATM), the S_RCV will reset the filter and resume reception for all class 4 cells.

In a network according to a preferred embodiment of the present invention, the non-interleaving IP cell transmission allows for the easy implementation of packet discarding. This is achieved in that in ATM the last cell of every packet is marked by one bit at the AAL (ATM Adaptation Layer) layer. When congestion occurs, the output port processor will immediately transmit to the next node a dummy cell with the last-cell bit on and drop all incoming calls until the end of the packet. Only one packet is affected in this way. This is in contrast to conventional interleaved arrangements in which when congestion occurs many packets are dropped and there is a significant amount of bandwidth waste.

Figure 5:
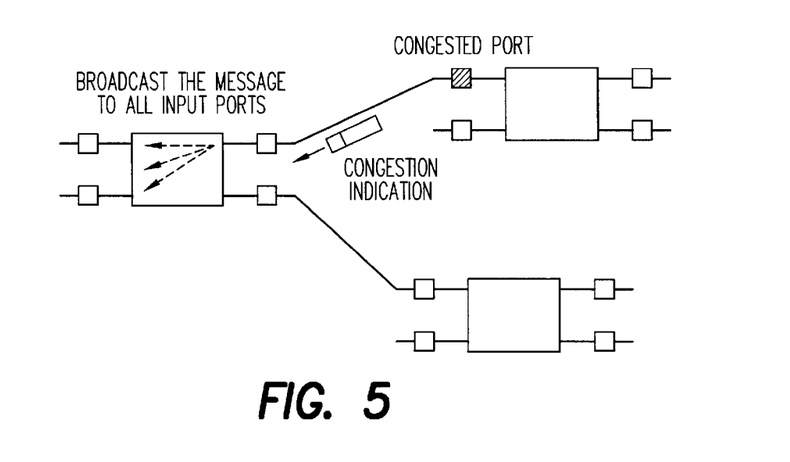
FIG. 5 illustrates the use of ATM signalling for IP congestion control.

Furthermore IP traffic can take advantage of ATM signalling for congestion control by means of a congestion indication signal being sent backwards using a designated ATM virtual channel. For example, referring to FIG. 5, if an input port is congested, a congestion indication signal can be sent backwards to the output port of the previous switch. That information can then be broadcast to all input ports and because the input and output port processors are co-located (as will be described below) and the switch has a full multicast capability. Once the information is received by an input processor it will be combined with other known ATM congestion control measures to regulate the flow. In addition the congestion indication signal can be sent further back down the line if necessary.

Figure 4:
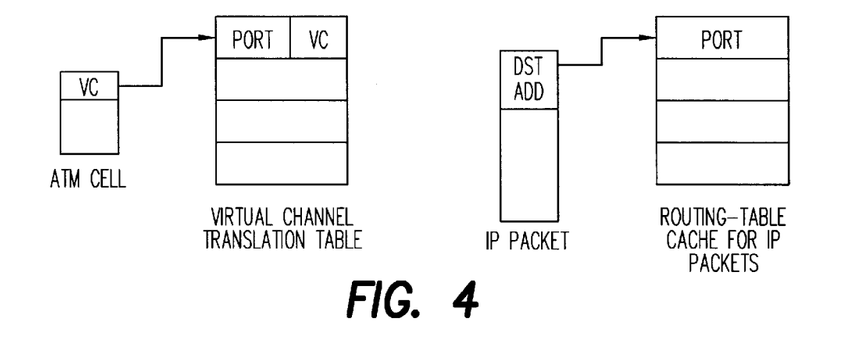
FIG. 4 shows look-up tables for incoming ATM cells or IP packets.

In the network of the present invention a high IP traffic throughput is important. When receiving an IP cell—the first cell of an IP packet—after firing an IP routing protocol the IP controller acquires the output port number for each destination address. This information is stored in a routing table inside the IP controller. The most recently used entries of this routing table are themselves stored in a cache inside the input port processors (FIG. 4) which is much smaller than the routing table in the IP controller. Upon arrival of the first cell of an IP packet the input processor checks to see if the necessary routing information is stored in its cache. If it is then switching the incoming IP packet will only take one table look-up to get the output port number and the process will take as little time as for switching an ATM cell (for which a virtual channel translation table is also located in the input port processor—again see FIG. 4). If the required routing information is not stored in the input port cache a message will be sent to the IP controller to retrieve the routing information and this information will then be stored in the cache at the expense of an older entry which is then displaced.

An important element in the architecture of the present invention is the switch. This must meet two major requirements: (1) no cell interleaving among IP packets, and (2) multicast ability for fast spreading of IP congestion control information. Requirement (1) is achieved by the prioritisation of cells described above, the implementation of (2) is described below.

The complexity of a multicast switch is related to three parameters: (1) fanout—the maximum number of copies duplicated by each inlet of the switch, (2) the frequency of adding and deleting a call party, and (3) the load ratio of multicast over unicast. Of these parameters fanout is the most significant in determining the complexity of the switch. If fanout=1 then the switch becomes a unicast switch, but a general multicast switch has to assume that the fanout is equal to the total number of outlets so that one-to-all multicast can be obtained if necessary.

In addition the second parameter—although a factor in unicast switch design assumes greater importance in multicast switches. In a multicast switch, when a call is added it may be added to an existing connection, and similarly when a call is deleted a connection may stay because other parties are still connected through the same channel. Not only does this parameter affect the definition of nonblocking, it can even break a switch and many conventional multicast ATM switches proposed so far do not work well if the frequency of adding and deleting called parties is high.

Figure 6A:
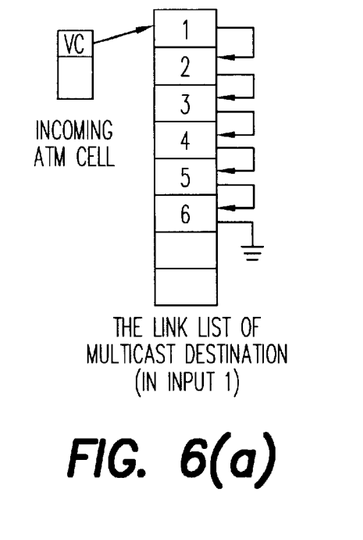
FIG. 6 illustrates the segmenting of a multicast link.
Figure 6B:
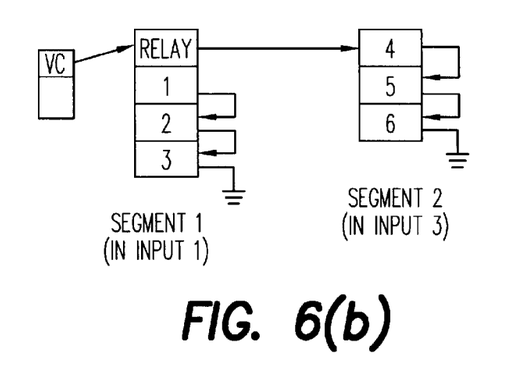
Figure 7B:
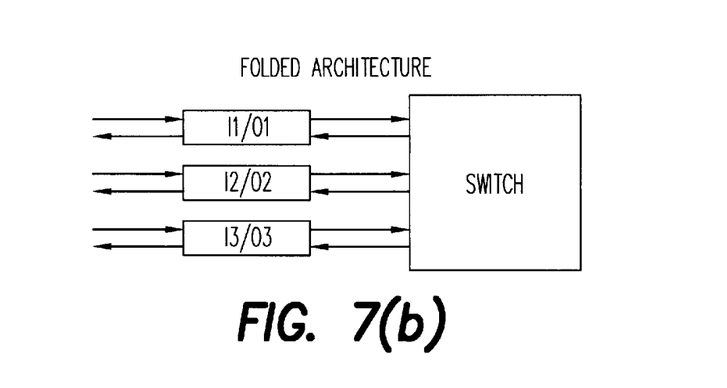

FIG. 6 illustrates an arrangement in which while the total number of copies generated inside the switch can be as large as the total number of outlets, the fanout may be made much smaller by taking advantage of the asynchronous nature of ATM communications. This may be achieved by segmenting the link list and by using a folded architecture for the switch. FIG. 6(a) shows a conventional arrangement with fanout=6, ie a one-to-six multicast. In FIG. 6(b) the link list is divided into two segments with, say, the first segment being put in input 1 and the second in, say, input 3, and the fanout=3 only. To trigger the second segment to generate three more copies an extra copy is added to the first segment to serve as a relay cell, and the switch employs a folded architecture where input and output processors are combined into one such that when the relay copy arrives from the switch it will be looped back instead of being sent out thus triggering the sending of three more copies. FIG. 7(b) shows a multicast switch with a folded architecture in comparison with an unfolded architecture shown in FIG. 7(a).

Such a folded architecture works particularly well in conjunction with an unbuffered self-routing network for two reasons. Firstly the time delay of crossing the switch in an unbuffered network is small and assigning priority to relay packets means that many segments can be transmitted at the same time. Secondly the hardware costs of an unbuffered plane are low and therefore multiple planes can be used to allow multiple packets to be sent out simultaneously. An unbuffered network has several advantages including simple node design, no out-of-sequence transmission, and independence of packet length, and any reduction in bandwidth caused by using an unbuffered network can be simply overcome by using multiple planes.

Figure 12:
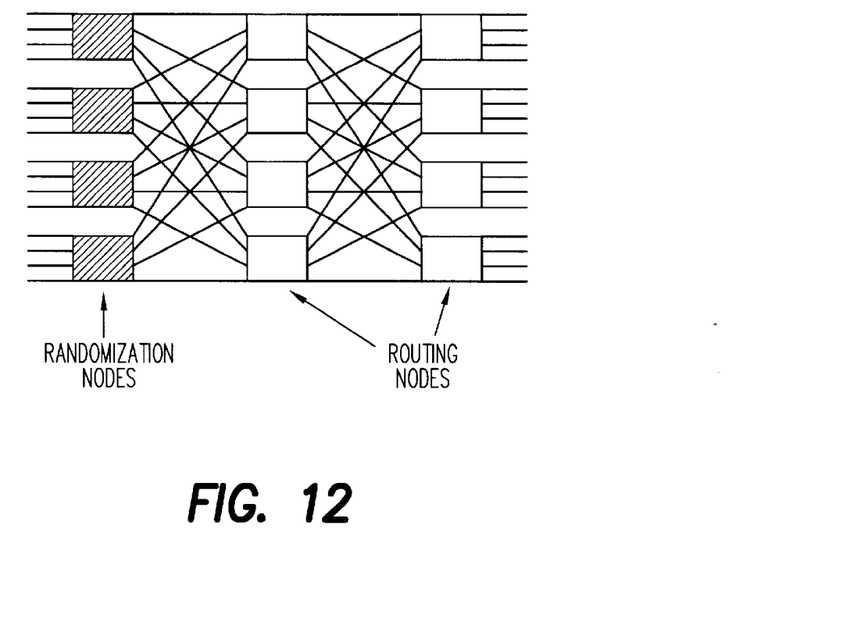
FIG. 12 is an illustration similar to FIG. 9 but with the addition of a randomization stage.
Figure 13:
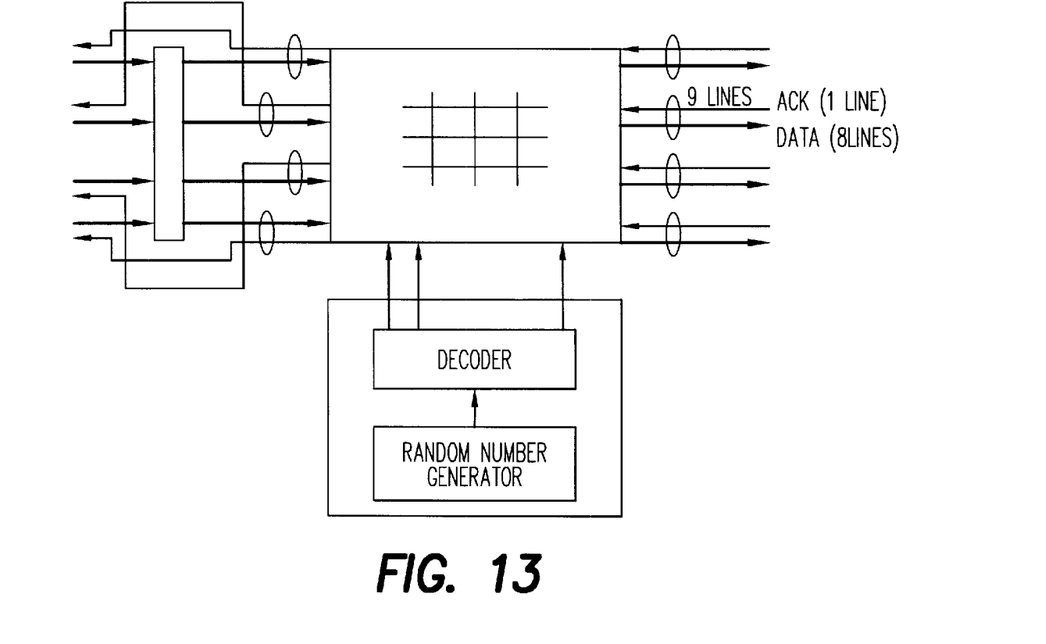
FIG. 13 is a figure similar to FIG. 10 but with the addition of a randomization stage.

For the switch fabric it is possible to add several stages of randomization nodes to evenly distribute the traffic. FIG. 12 gives one example where one stage of 4×4 nodes are added to that of FIG. 9. The purpose of the randomization nodes is to randomly connect one input to an output. Thus there is no blocking involved in the process. The design of the randomization stage is similar to, but simpler than, that of a routing node shown in FIG. 9. The major difference lies in how the states are set. For randomization, the states are not controlled by the destination addresses, nor the priorities, of the incoming packets, but instead are set by a random number generator (FIG. 13). Based on a random number an input will be randomly connected to an output. For a 4×4 node there are 16 possible ways to connect inputs to outputs and the states of the crosspoints corresponding to each of the 16 permutations will be stored in the decoder's memory. The random number is used to retrieve these states.

What is claimed is:

1. An information network system comprising,
   a plurality of unbuffered switches, each said switch comprising input and output ports and being interconnected by datalinks to form a network,
   each said switch being associated with an ATM control processor and an IP control processor, and
   wherein said network is adapted to carry both ATM and IP transmissions, said IP transmissions being carried on a default virtual channel with no interleaving of IP packets.

2. A system as claimed in claim 1 wherein each said switch handles incoming traffic according to a sequence of priorities depending on the transmission type.

3. A system as claimed in claim 2 wherein priority is given to ATM transmissions over IP transmissions.

4. A system as claimed in claim 2 wherein the priorities are:
   (a) operation function and multicast relay cells
   (b) ATM realtime transmissions
   (c) remaining cells of an IP packet after initial transmission of the first cell
   (d) the first cell of a new IP packet
   wherein (a) is of the highest priority and (d) is of the lowest priority.

5. A system as claimed in claim 1 wherein each said switch has a folded architecture wherein the input and output ports are combined.

6. A system as claimed in claim 4 wherein each switch has multicast capability with a segmented link list.

7. A system as claimed in claim 1 comprising congestion control means.

8. A system as claimed in claim 7 wherein said congestion control means comprises means for sending a congestion indication signal backwards to the output port of an upstream switch using a designated virtual ATM channel.

9. A system as claimed in claim 7 wherein said congestion control means comprises a means for discarding a single IP packet.

10. A system as claimed in claim 1 wherein said IP default virtual channel carries non-realtime ATM transmissions.

11. A method for transmitting IP and ATM data on a single network, said method comprising the steps of:
    transmitting IP cells along a link with a system of priorities, wherein IP cells are included within IP packets; and
    transmitting ATM cells along the link, and
    wherein said ATM transmissions have higher priority within said system of priorities than said IP transmissions, and
    wherein there is no interleaving of said IP packets.

12. The method as claimed in claim 11 wherein after transmission of a first cell of a first IP packet, transmission of remaining cells of said first IP packet have higher priority than a first cell of a second IP packet.

13. An unbuffered switch for use in an information network system transmitting IP and ATM data, comprising,
    a plurality of input and output ports for respectively receiving and transmitting data;
    a switch matrix for interconnecting selected input ports with selected output ports, and a controller for controlling said switch matrix in response to destination information in said received data,
    wherein said controller further comprises means for controlling said switch matrix in response to priority information in said received data such that no interleaving of IP packets occurs.

14. A switch as claimed in claim 13 wherein said switch comprises path set-up means for establishing a path to a selected destination for received data, and wherein reverse path acknowledgement means confirm the completion of said path before the end of the transmission of said data.

15. A switch as claimed in claim 13 wherein said switch has a folded arcitecture wherein each said input port is combined with a said output port.

16. A switch as claimed in claim 13 wherein said switch comprises a plurality of interconnected sub-switch elements.

17. A switch as claimed in claim 13 wherein said switch includes a buffer between said input ports and said switch matrix.

\* \* \* \* \*